(12) United States Patent
Plasek et al.

(10) Patent No.: US 6,728,709 B1
(45) Date of Patent: Apr. 27, 2004

(54) LOCKING PARTITIONED DATABASE TABLES

(75) Inventors: James M. Plasek, Shoreview, MN (US); John C. Rust, Brooklyn Park, MN (US); Don W. Frauendienst, Coon Rapids, MN (US)

(73) Assignee: Unisys Corporation, Blue Bell, PA (US)

( * ) Notice: Subject to any disclaimer, the term of this patent is extended or adjusted under 35 U.S.C. 154(b) by 321 days.

(21) Appl. No.: 09/887,640

(22) Filed: Jun. 22, 2001

(51) Int. Cl.$^7$ .......................... G06F 17/30; G06F 17/00
(52) U.S. Cl. ........................ 707/8; 707/101; 711/152
(58) Field of Search .................... 707/8, 101, 200; 711/152, 173

(56) References Cited

U.S. PATENT DOCUMENTS

| | | | |
|---|---|---|---|
| 4,716,528 A | * 12/1987 | Crus et al. | 710/200 |
| 5,448,727 A | * 9/1995 | Annevelink | 707/101 |
| 5,596,754 A | * 1/1997 | Lomet | 710/200 |
| 5,717,919 A | * 2/1998 | Kodavalla et al. | 707/8 |
| 6,041,384 A | * 3/2000 | Waddington et al. | 710/200 |
| 6,343,296 B1 | * 1/2002 | Lakhamraju et al. | 707/103 R |
| 6,411,964 B1 | * 6/2002 | Iyer et al. | 707/200 |
| 6,438,562 B1 | * 8/2002 | Gupta et al. | 707/201 |

OTHER PUBLICATIONS

Hoevel et al "File partitioning as a means to reduce lock contention in a multiprocessor environment", IEEE 1992, pp. 211–217.*
Alexander Thomasian, "A performance comparison of locking methods with limited wait depth", IEEE 1997, pp. 421–434.*
Thekkath et al, "Frangipani: a scalable distributed file system", ACM 1997, pp. 224–237.*
Kim et al, "MIDAS: design philosophy and internals", IEEE 1992, pp. 0132–0139.*

* cited by examiner

*Primary Examiner*—Uyen Le
(74) *Attorney, Agent, or Firm*—Charles A. Johnson; Mark T. Starr; Crawford Maunu, PLLC

(57) ABSTRACT

A method and apparatus for locking a database table having a plurality of partitions. In various embodiments, lock status codes are maintained for both a database table and for the partitions of the database table. The partition locks do not need to be updated when a lock is granted for the database table since a separate table lock status code is maintained. The separate table lock status code improves database application performance and simplifies programming of explicit lock operations.

10 Claims, 3 Drawing Sheets

LOCKING PARTITIONED DATABASE TABLES

FIELD OF THE INVENTION

The present invention generally relates to database management systems, and more particularly to lock management for partitioned databases.

BACKGROUND OF THE INVENTION

A database is partitioned for administrative and performance purposes. A partition is defined in terms of a range of keys, either primary or secondary, to records in a table. Partitions allow a database administrator (DBA) to add, delete, or change information for a range of records in a table. For example, if some data within a partition of the table is no longer valid, the DBA can remove the partition that contains invalid data and then restore the valid data to the partition. Without partitions, the DBA would have to remove the entire table and restore the valid data, thereby making the entire database inaccessible to users. The partitions allow a user to continue to access some portions of a table while another portion of it has been removed for maintenance.

In support of concurrent access to a database, data locks are used to protect the data in individual rows, partitions, or database tables. Partition-level locking allows a user to lock a particular partition without impacting other users' access to other partitions. Some databases include many partitions for administrative convenience and for promoting concurrent access. However, some database applications and operations require locking every partition in the database, which is known as a "table lock."

In a database having many partitions, frequent table locks may negatively impact system performance. Since every partition must be checked and locked to issue a table lock, the time required to process a table lock will depend in part on the number of partitions. Furthermore, frequent table locks will multiply the inefficiency.

A method and apparatus that addresses the aforementioned problems, as well as other related problems, are therefore desirable.

SUMMARY OF THE INVENTION

In various embodiments, the invention provides a method and apparatus for locking a database table having a plurality of partitions. Separate lock status codes are maintained for both the entire database table and for the partitions of the database table. The partition locks do not need to be updated when a lock is granted for the database table since a separate table lock status code is maintained. The separate table lock status code improves database application performance and simplifies programming of explicit lock operations.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

Figure 1:
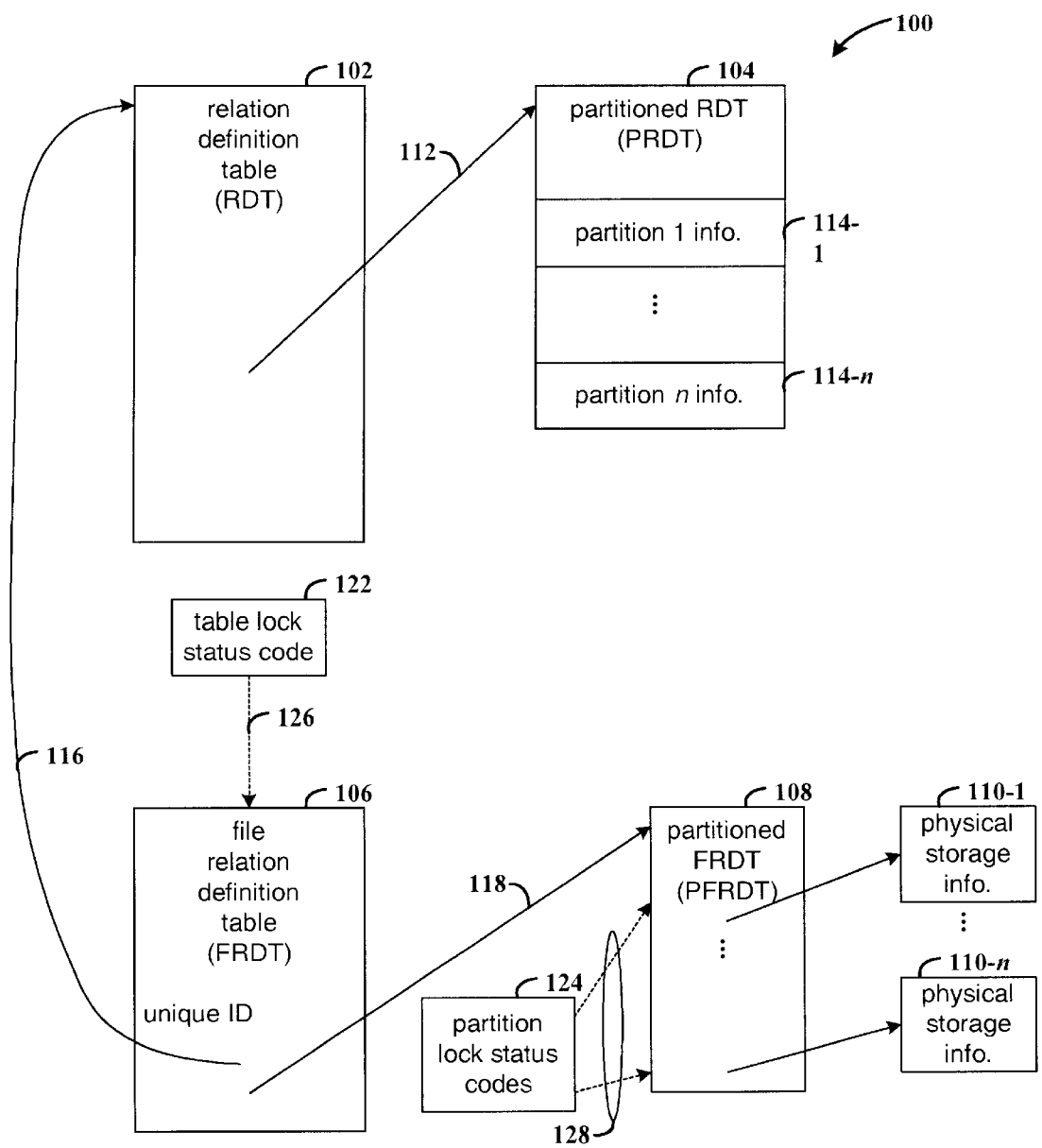
FIG. 1 is a block diagram of the data structures used in maintaining table locks in a partitioned database in accordance with one embodiment of the invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

In various embodiments of the invention, a locking mechanism is provided for a partitioned database table. The locking mechanism supports locking at the table-version level ("table level") and at the partition level. At the table level, a single lock status code is maintained for locking the entire table. In addition, for each of the partitions there is an associated partition lock status code. Thus, if a lock is needed on the entire table, a single lock can be issued rather than issuing a lock on every partition of the table. The time savings can be considerable in applications where the table is frequently locked and the table has many partitions.

FIG. 1 is a block diagram that illustrates the relationship between various data structures used in maintaining locks for a partitioned database in accordance with one embodiment of the invention. Data structure arrangement 100 includes relation definition table (RDT) 102, partitioned relation definition table (PRDT) 104, file relation definition table (FRDT) 106, and partitioned file relation definition table (PFRDT) 108. At the top of the hierarchy, relation definition table 102 is the encoded form of a table definition, for example, a DBMS (not shown) implementation of an SQL table definition. At the bottom of the hierarchy are the data managed by the DBMS. The data are accessed by reference to blocks 110-1–110-n, each of which includes information that describes the physical storage location of an associated one of the partitions.

The definitions of the partitions are stored in PRDT 104, which is referenced by RDT 102 as shown by line 112. Each partition has an associated entry in PRDT 104, and each entry includes the name of the storage area in which the data within the partition are stored. Blocks 114-1–114-n illustrate the entries for the partitions of the table defined in RDT 102.

FRDT 106 is a database management system data structure that, in an example embodiment, connects a particular version of a database table with the relation definition table. Versions are supported by some DBMSs, for example, UDS from Unisys, for maintaining different data sets for different purposes. For example, one version of a database table may be a test version, and another version the production version. For each version, there is a separate instance of the FRDT 106, which include a unique identifier. Each FRDT 106 references the RDT 102 that defines the relation, as shown by line 116. The FRDT provides a control structure and entry point through which data in a particular version of a database table is referenced. FRDT 106 points to PFRDT 108 as shown by line 118.

PFRDT 108 includes respective pointers to the physical storage information blocks 110-1–110-n. The pointers in PFRDT 108 correspond to the partition information blocks 114-1–114-n in the PRDT 104.

The DBMS also maintains lock status information for controlling access to the database table. The lock status information is maintained at the table level, as illustrated by block 122, and at the partition level as illustrated by block 124. Dashed line 126 that connects block 122 to block 106 indicates that the table lock status code is associated with the FRDT 106, and the dashed lines 128 from block 124 to block 108 indicate that the partition lock status codes 124 are respectively associated with the partition data referenced by PFRDT 108.

The table lock status code 122 is used when control is needed over all the partitions that comprise the database table referenced by FRDT 106. The partition lock status codes 124 are used when partition-level control is needed. The table lock status code 122 provides a single control point over a partitioned table so that all of the partition lock status codes 124 need not be manipulated when a lock on the entire table is required. For example, using the table lock status code 122 the FRDT 106 can be locked in exclusive update mode such that only the user that issued the lock can access the table. This eliminates having to update all the individual partition lock status codes 124 of the partitions.

In another embodiment, each FRDT 106 for a version of a database table has an associated table lock status code 122. Even though only one FRDT 106 and table lock status code 122 is shown for RDT 102, it will be appreciated that where there exist multiple table versions of and RDT, there are corresponding FRDTs and table lock status codes. Thus, each table version can be locked independent of other table versions.

Figure 2:
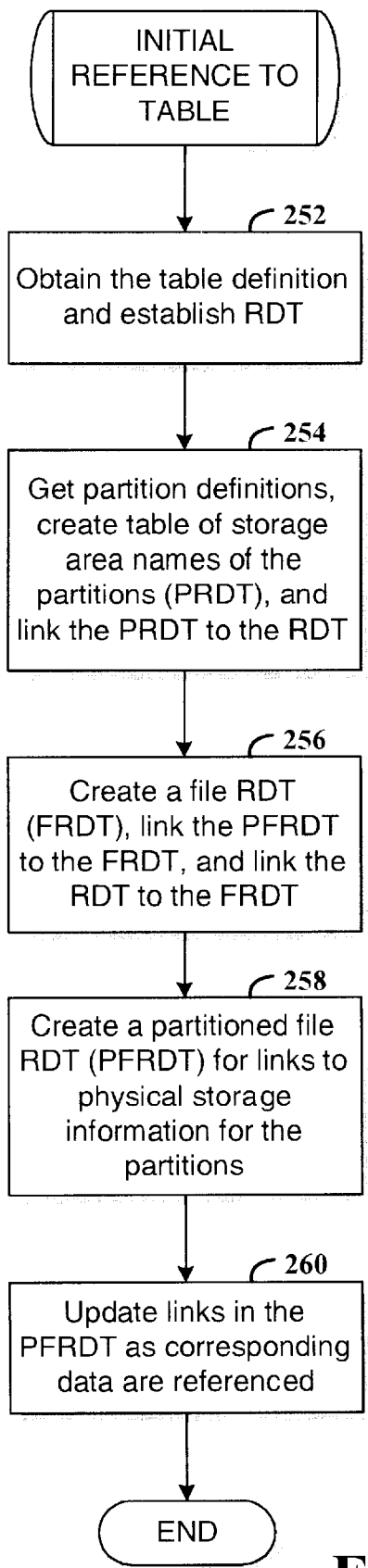
FIG. 2 is a flowchart of a process that illustrates the steps performed when a reference is first made to a partitioned database.

FIG. 2 is a flowchart of an example process that illustrates updates to structures in data structure arrangement 100 when an initial reference is made to a table. When an application references a table for the first time, the RDT 102 for the table is obtained. At step 252, the definition of the table is obtained from retentive storage and stored in the RDT. In the example embodiment, the partition information is stored in a file that is separate from the file in which the relation definition is stored. At step 254, the partition definitions are read from file storage and stored in the PRDT 104. The PRDT 104 is then linked to the RDT 102.

At step 256, the FRDT 106 is created, and the RDT 102 is linked to the FRDT. The FRDT is associated with a selected version of the database. Each version is identified by a unique identifier code, which is stored in the FRDT. At step 258, the PFRDT 108 is created and linked to the FRDT 106. In the example embodiment, PFRDT 108 is an array of pointers for the partitions. Each pointer references a physical storage information block (110-1–110-n) for one of the partitions. As data in the partitions are referenced, the pointers are updated to reference the physical storage information blocks, as shown by step 260.

Figure 3:
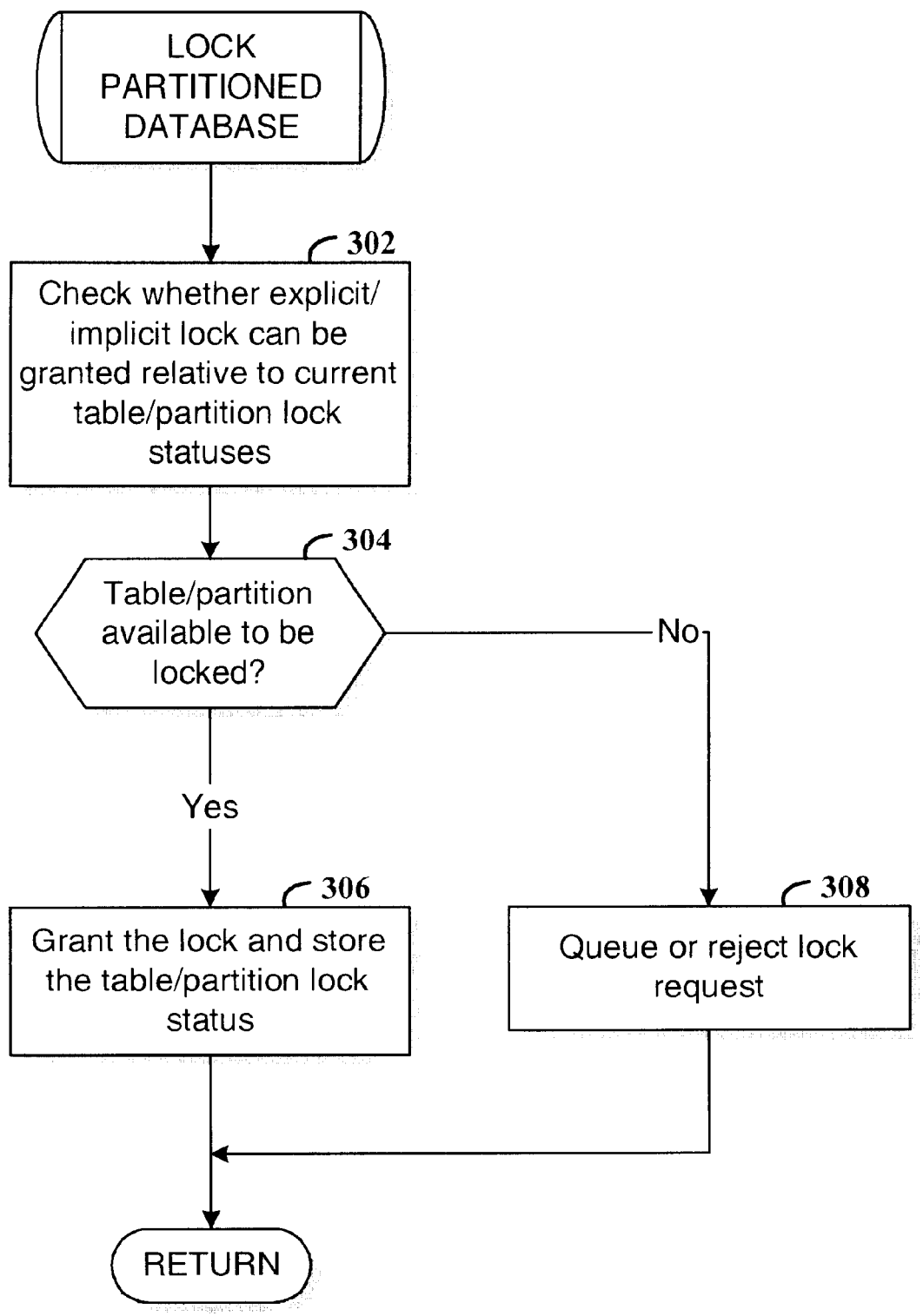
FIG. 3 is a flowchart of an example process for locking a partitioned database.

FIG. 3 is a flowchart of a example process for locking a partitioned database. It will be appreciated that lock requests may emanate explicitly or implicitly from an application. Implicit locks are those issued by the DBMS in response to non-lock operations requested by the application. Explicit locks are those issued by the application. Relative to the present invention, the processing performed for explicit and implicit locks is the same.

At step 302, the process checks whether the explicit/implicit lock can be granted given the current state of the table lock status code and the partition lock status codes.

While not shown, it will be appreciated that when a user attempts to access the database table, both the table lock status 122 and the lock statuses of the partitions are probed as necessary to control access. If a table lock is requested, the current table lock status code must be checked to see whether the table lock can be granted. Similarly, if a partition lock is requested, the partition lock status code must be checked. If the current state of the table lock status and the partition lock status codes allows the lock to be granted, decision step 304 directs the process to step 306.

At step 306, the lock is granted and the table lock status code or partition lock status code is updated accordingly. For a request to lock the database table, the table lock status code 122 is updated. The appropriate one of partition lock status codes 124 is updated for a partition lock request. Since updating the partition lock status codes is unnecessary for table lock requests, application performance is improved. In addition, applications can be simplified since explicitly locking a table requires a single lock rather than individual partition locks.

If the requested lock cannot be granted, decision step 304 directs the process to step 308 where the lock request is either queued or rejected, depending on implementation requirements. The process returns to the calling application after the lock is granted or rejected.

While not shown, it will be appreciated that in unlocking a partition or the entire table, the lock status code associated with the partition or table is cleared. In addition and depending on the implementation, a queued lock request for the partition or table is processed after the lock is released.

Accordingly, the present invention provides, among other aspects, a method and apparatus for maintaining locks in a partitioned database. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for locking a database table having a plurality of partitions, comprising:

establishing a relation definition table that defines a format for the database table;

establishing a partition definition table that specifies a partition definition of the database table;

maintaining a plurality of database tables consistent with the database relation and the partition definition, wherein each database table includes data that are independent of data in others of the database tables;

maintaining respective sets of partition lock status codes for the plurality of database tables, each partition lock status code respectively associated with one of the plurality of partitions of a database table to indicate lock statuses of the one of the partitions;

maintaining respective table lock status codes indicating lock statuses of the database tables.

2. The method of claim 1, further comprising in response to a request to lock a selected one of the database tables, checking the table lock status code associated with the selected one of the database tables for availability of the requested lock.

3. The method of claim 1, further comprising in response to a request to lock a selected partition of a selected one of the database tables, checking the partition lock status code corresponding to the selected partition of the selected one of the database tables for availability of the requested lock.

4. A computer-implemented method for locking a database table having a plurality of partitions, comprising:

establishing a relation definition table that defines a format for the database table;

establishing a partition definition table that specifies a partition definition of the database table and linking the partition definition table to the relation definition table;

establishing a first table for storage of references to physical descriptions of storage areas of the files associated with the partitions;

establishing a second table that references the relation definition table and the first table;

storing partition lock status codes in association with the plurality of partitions to indicate lock status of the partitions; and storing a table lock status code associated with the second table to indicate lock status of the database table.

5. The method of claim 4, further comprising in response to a request to lock the database table, checking the table lock status code for availability of the requested lock.

6. The method of claim 4, further comprising in response to a request to lock a selected partition, checking the partition lock status code corresponding to the selected partition for availability of the request ed lock.

7. The method of claim 4, further comprising:

maintaining a plurality of database tables consistent with the database relation and the partition definition, wherein each database table includes data that are independent of data in others of the database tables;

maintaining respective table lock status codes indicating lock statuses of the plurality of database tables; and maintaining respective sets of partition lock status codes for the plurality of database tables.

8. The method of claim 7, further comprising in response to a request to lock a selected one of the database tables, checking the table lock status code associated with the selected one of the database tables for availability of the requested lock.

9. The method of claim 7, further comprising in response to a request to lock a selected partition of a selected one of the database tables, checking the partition lock status code corresponding to the selected partition of the selected one of the database tables for availability of the requested lock.

10. An apparatus for locking a database table having a plurality of partitions, comprising:

means for establishing a relation definition table that defines a format for the database table;

means for establishing a partition definition table that specifies a partition definition of the database table and linking the partition definition table to the relation definition table;

means for establishing a first table for storage of references to physical descriptions of storage areas of the files associated with the partitions;

means for establishing a second table that references the relation definition table and the first table;

means for storing partition lock status codes in association with the plurality of partitions to indicate lock status of the partitions; and means for storing a table lock status code associated with the second table to indicate lock status of the database table.

* * * * *